(12) United States Patent
Cao

(10) Patent No.: US 9,332,607 B2
(45) Date of Patent: May 3, 2016

(54) LED BACKLIGHT DRIVING CIRCUIT AND LIQUID CRYSTAL DISPLAY DEVICE

(71) Applicant: Shenzhen China Star Optoelectronics Technology Co., Ltd., Shenzhen, Guangdong (CN)

(72) Inventor: Dan Cao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 186 days.

(21) Appl. No.: 14/371,725

(22) PCT Filed: Jun. 27, 2014

(86) PCT No.: PCT/CN2014/080974
§ 371 (c)(1),
(2) Date: Jul. 10, 2014

(87) PCT Pub. No.: WO2015/192390
PCT Pub. Date: Dec. 23, 2015

(65) Prior Publication Data
US 2015/0373800 A1  Dec. 24, 2015

(51) Int. Cl.
*G09G 3/36* (2006.01)
*H05B 37/00* (2006.01)
*H05B 33/08* (2006.01)
*G02F 1/1335* (2006.01)

(52) U.S. Cl.
CPC ...... *H05B 33/0842* (2013.01); *G02F 1/133603* (2013.01); *H05B 33/0815* (2013.01)

(58) Field of Classification Search
CPC .................. H05B 33/0815; H05B 33/0896
USPC .......... 345/102; 315/185 R, 209 R, 247, 291, 315/307, 308
See application file for complete search history.

(56) References Cited

U.S. PATENT DOCUMENTS

| | | | | |
|---|---|---|---|---|
| 8,421,364 | B2 * | 4/2013 | Archibald | H05B 33/0827 315/185 R |
| 8,482,225 | B2 * | 7/2013 | Szczeszynski | H05B 33/0818 315/185 R |
| 2010/0013395 | A1 * | 1/2010 | Archibald | H05B 33/0827 315/185 R |

FOREIGN PATENT DOCUMENTS

| | | |
|---|---|---|
| CN | 103354086 A | 10/2013 |
| CN | 103531156 A | 1/2014 |
| CN | 103595018 A | 2/2014 |

* cited by examiner

*Primary Examiner* — Thuy Vinh Tran
(74) *Attorney, Agent, or Firm* — Andrew C. Cheng

(57) ABSTRACT

A LED backlight driving circuit includes a voltage boosting circuit for converting an input voltage into an output voltage for a LED string; a current control module connected to a negative terminal of the LED string and for regulating a working current of the LED string; a driver chip for supplying the voltage boost circuit and current control module respectively with first and second square wave signals; a current detection module for detecting the working current of the LED string to generate detection signal; a control signal module for receiving the detection signal to generate a control signal; and a frequency regulation module for receiving the control signal to thereby generate a resistance. The frequency regulation module connects the driver chip, and the driver chip regulates a driving frequency of the driving circuit according to the resistance. A LCD device using the driving circuit also is provided.

20 Claims, 4 Drawing Sheets

US 9,332,607 B2

LED BACKLIGHT DRIVING CIRCUIT AND LIQUID CRYSTAL DISPLAY DEVICE

TECHNICAL FIELD

The present invention relates to a LED backlight driving circuit, and particularly to a LED backlight driving circuit which can adjust a driving frequency according to a magnitude of working current, and a liquid crystal display device using such LED backlight driving circuit.

DESCRIPTION OF RELATED ART

With the advancement of technology, the backlight technology of liquid crystal display device is continuously developed. The backlight source of traditional liquid crystal display device usually is cold cathode fluorescent lamp (CCFL). However, since the CCFL backlight source has the drawbacks of poor color reproduction, low luminous efficiency, high discharge voltage, poor discharge characteristic in low-temperature and long heating time up to stable luminance, a backlight technology using a LED backlight source currently have been proposed.

FIG. 1 is a circuit diagram of a conventional driving circuit for a LED backlight source of liquid crystal display device. As illustrated in FIG. 1, the driving circuit for LED backlight source includes a voltage boost circuit, a driver chip and a LED string. The voltage boost circuit includes an inductor L, a rectifier diode D1, a first field effect transistor (FET) Q1, a capacitor C and a first resistor R1. A terminal of the inductor L receives an input direct current (DC) voltage Vin, another terminal of the inductor L is connected to a positive terminal of the rectifier diode D1 as well as a drain of the first FET Q1, a gate of the first FET Q1 is driven by a first square wave signal PWM1 supplied from the driver chip, a source of the first FET Q1 is electrically connected to ground through the first resistor R1, a negative terminal of the rectifier diode D1 supplies an output voltage Vout to the LED string, and the negative terminal of the rectifier diode D1 further is electrically connected to ground through the capacitor C. A negative terminal of the LED string is connected to a second FET Q2. In particular, a drain of the second FET Q2 is connected to the negative terminal of the LED string, a source of the second FET Q2 is electrically connected to ground through a third resistor R3, and a gate of the second FET Q2 is driven by a second square wave signal PWM2 by the driver chip. By varying a duty ratio of the second square wave signal PWM2, a working current of the LED string can be increased or decreased. In the driving circuit, the driver chip further is connected to a second resistor R2 for determining a driving frequency Fs of the driving circuit.

In the above described driving circuit, the driving frequency is fixed and a calculation equation is $$Fs = \frac{\gamma}{R1},$$

where $\gamma$ is an internally fixed constant of the driver chip. An output power P of the driving circuit is:

$$P = \frac{1}{2} \times L \times (I_p)^2 \times Fs,$$

where L is an inductance of the inductor L, Ip is a peak value of a current flowing through the inductor L. when the working current of the LED string is decreased by reducing the duty ratio of the second square wave signal PWM2, the output power of the driving circuit is decreased, and the driving frequency Fs may be decreased correspondingly. However, as described above, since the driving frequency Fs of the driving circuit is fixed, and power consumptions of the inductor L, the rectifier diode D1 and the first FET Q1 in the voltage boost circuit each are positively proportional to the driving frequency Fs, in the situation of the duty ratio of the second square wave signal PWM2 being decreased, the driving frequency Fs ought to correspondingly decrease but actually is not decreased, which would deteriorate the driving efficiency of the driving circuit.

SUMMARY

In order to overcome the drawbacks of the prior art, an objective of the present invention is to provide a LED backlight driving circuit, which can adjust a driving frequency according to a magnitude of working current, and thereby reduces the power consumption and increases the driving efficiency of the driving circuit.

In order to achieve the above objective, the present invention proposes the following solutions.

In particular, a LED backlight driving circuit includes: a voltage boost circuit for converting an input voltage into an output voltage for a LED string; a current control module electrically connected to a negative terminal of the LED string and for regulating a working current of the LED string; a driver chip for supplying the voltage boost circuit with a first square wave signal to make the voltage boost circuit achieve a voltage boosting function and supplying the current control module with a second square wave signal to make the current control module achieve a current control function; a current detection module for detecting the working current of the LED string and generating a detection signal according to the detected working current; a control signal module for receiving the detection signal generated from the current detection module and generating a control signal according to the detection signal; and a frequency regulation module for receiving the control signal generated from the control signal module and generating a resistance according to the control signal. The frequency regulation module further is electrically connected to the driver chip, and the driver chip regulates a driving frequency of the LED backlight driving circuit according to the resistance.

In an exemplary embodiment, the current detection module includes a photo coupler. Input terminals of the photo coupler are electrically connected in a loop of the LED string, and an output terminal of the photo coupler is for generating a voltage detection signal.

In an exemplary embodiment, the photo coupler comprises a light emitting diode and a photodiode. A positive terminal of the light emitting diode is electrically connected to an output terminal of the voltage boost circuit, and a negative terminal of the light emitting diode is electrically connected to a positive terminal of the LED string. A positive terminal of the photodiode is electrically connected to a first working voltage, and a negative terminal of the photodiode is electrically connected to ground through a fourth resistor. The negative terminal of the photodiode is for generating the voltage detection signal.

In an exemplary embodiment, the control signal module includes a first comparator and a second comparator. An inverting input terminal of the first comparator is electrically connected to receive a first reference voltage, a non-inverting input terminal of the second comparator is electrically connected to receive a second reference voltage, a non-inverting input terminal of the first comparator and an inverting input terminal of the second comparator are electrically connected to receive the detection signal outputted from the current detection module, and control signals generated from output terminals of the first comparator and the second comparator are individually inputted to the frequency regulation module. The detection signal is a voltage detection signal, and the first reference voltage is greater than the second reference voltage.

In an exemplary embodiment, the frequency regulation module includes multiple circuit loops formed by electrically connected multiple resistors and multiple switching elements. The control signal generated from the control signal module controls on-off states of the switching elements to thereby selectively switch on different circuit loops with different resistances to electrically communicate with the driver chip.

In an exemplary embodiment, the switching elements are field effect transistors or triodes.

In an exemplary embodiment, the frequency regulation module includes a fifth resistor, a first terminal of the fifth resistor is electrically connected to the driver chip, and a second terminal of the fifth resistor is electrically connected to ground through a sixth resistor. The first terminal of the fifth resistor further is electrically connected to a terminal of a seventh resistor, another terminal of the seventh resistor is electrically connected to a drain of a third field effect transistor, a source of the third field effect transistor is electrically connected to ground, and a gate of the third field effect transistor is electrically connected to receive one the control signal outputted from the control signal module. The second terminal of the fifth resistor further is electrically connected to a drain of the fourth field effect transistor, a source of the fourth field effect transistor is electrically connected to ground, and a gate of the fourth field effect transistor is electrically connected to a second working voltage through a eighth resistor. A gate of the fourth field effect transistor further is electrically connected to a drain of a fifth field effect transistor, a source of the fifth field effect transistor is electrically connected to ground, and a gate of the fifth field effect transistor is electrically connected to another the control signal outputted from the control signal module. The control signals outputted from the control signal module each are a logic high level or a logic low level, which make the third through fifth field effect transistors each are switched-on or switched-off and thereby the frequency regulation module generates different resistances to electrically communicate with the driver chip.

In an exemplary embodiment, the current detection module includes a photo coupler. The photo coupler includes a light emitting diode and a photodiode. A positive terminal of the light emitting diode is electrically connected to an output terminal of the voltage boost circuit, a negative terminal of the light emitting diode is electrically connected to a positive terminal of the LED string, a positive terminal of the photodiode is electrically connected to a first working voltage, a negative terminal of the photodiode is electrically connected to ground through a fourth resistor, and the negative terminal of the photodiode further is configured for generating a voltage detection signal. The control signal module includes a first comparator and a second comparator. An inverting input terminal of the first comparator is electrically connected to receive a first reference voltage, a non-inverting input terminal of the second comparator is electrically connected to receive a second reference voltage, a non-inverting input terminal of the first comparator and an inverting input terminal of the second comparator are electrically connected to receive the voltage detection signal outputted from the current detection module, control signals generated from output terminals of the first comparator and the second comparator individually are inputted to the frequency regulation module. The first reference voltage is greater than the second reference voltage. The frequency regulation module includes a fifth resistor, a first terminal of the fifth resistor is electrically connected to the driver chip, and a second terminal of the fifth resistor is electrically connected to ground through a sixth resistor. The first terminal of the fifth resistor further is electrically connected to a terminal of a seventh resistor, another terminal of the seventh resistor is electrically connected to a drain of a third field effect transistor, a source of the third field effect transistor is electrically connected to ground, and a gate of the third field effect transistor is electrically connected to the output terminal of the first comparator. The second terminal of the fifth resistor further is electrically connected to a drain of a fourth field effect transistor, a source of the fourth field effect transistor is electrically connected to ground, and a gate of the fourth field effect transistor is electrically connected to a second working voltage through a eighth resistor. The gate of the fourth field effect transistor further is electrically connected to a drain of a fifth field effect transistor, a source of the fifth field effect transistor is electrically connected to ground, and a gate of the fifth field effect transistor is electrically connected to the output terminal of the second comparator.

In an exemplary embodiment, the current control module includes a second field effect transistor and a third resistor. A drain of the second field effect transistor is electrically connected to the negative terminal of the LED string, a source of the second field effect transistor is electrically connected to ground through the third resistor, a gate of the second field effect transistor is electrically connected to the driver chip and driven by the second square wave signal supplied by the driver chip, and thereby by varying a duty ratio of the second square wave signal, the working current of the LED string is increased or decreased.

In another aspect, a liquid crystal display device according to an exemplary embodiment of the present invention includes a liquid crystal panel and a backlight module disposed opposite to each other. The backlight module provides a display light source to the liquid crystal panel for image display. The backlight module uses a LED backlight source. The LED backlight source adopts the above described LED backlight driving circuit.

Sum up, as to the backlight driving circuit of the present invention, by detecting the working current of LED string, according to the change of the detected working current, the frequency regulation module thereof selectively switches on circuit loops with different resistances to electrically communicate with the driver chip, and thereby different driving frequencies can be obtained. That is, when the duty ratio of the square wave signal for controlling the working current of LED string decreases, the output power of the driving circuit decreases, the driving frequency is decreased correspondingly. As a result, the power consumption of the driving circuit is reduced and the driving efficiency is increased.

BRIEF DESCRIPTION OF THE DRAWINGS

The above embodiments will become more readily apparent to those ordinarily skilled in the art after reviewing the following detailed description and accompanying drawings.

DETAILED DESCRIPTION OF EMBODIMENTS

The present invention will now be described more specifically with reference to the following embodiments. It is to be noted that the following descriptions of embodiments are presented herein for purpose of illustration and description only. It is not intended to be exhaustive or to be limited to the precise form disclosed.

Figure 1:
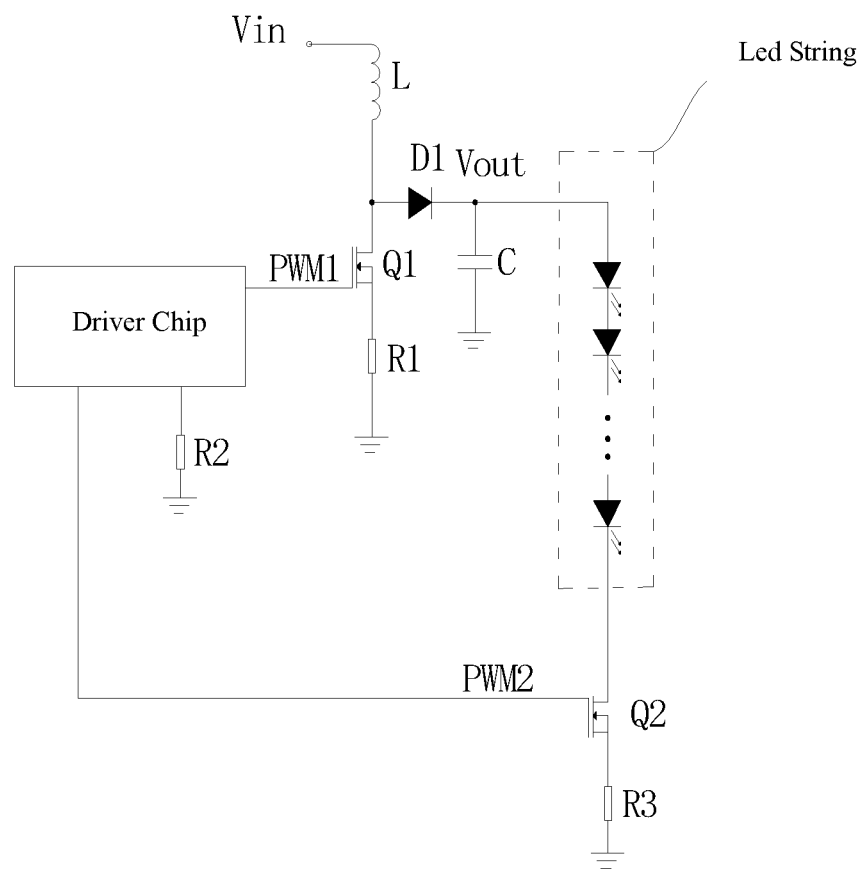
FIG. 1 is a circuit diagram of a conventional driving circuit for a LED backlight source of a liquid crystal display device.
Figure 2:
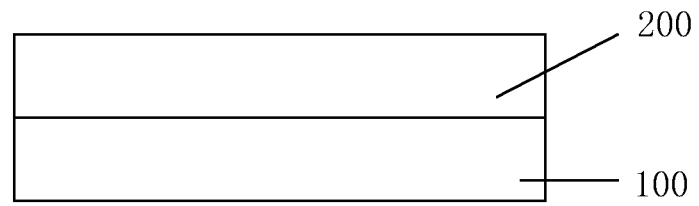
FIG. 2 is a schematic structural view of a liquid crystal display device according to an exemplary embodiment of the present invention.

Referring to FIG. 2, a liquid crystal panel 200 and a backlight module 100 disposed opposite to each other according to an exemplary embodiment of the present invention are provided. The backlight module 100 provides a display light source for the liquid crystal panel 200, so as to make the liquid crystal panel 200 to display an image. The backlight module 100 uses a LED backlight source.

Figure 3:
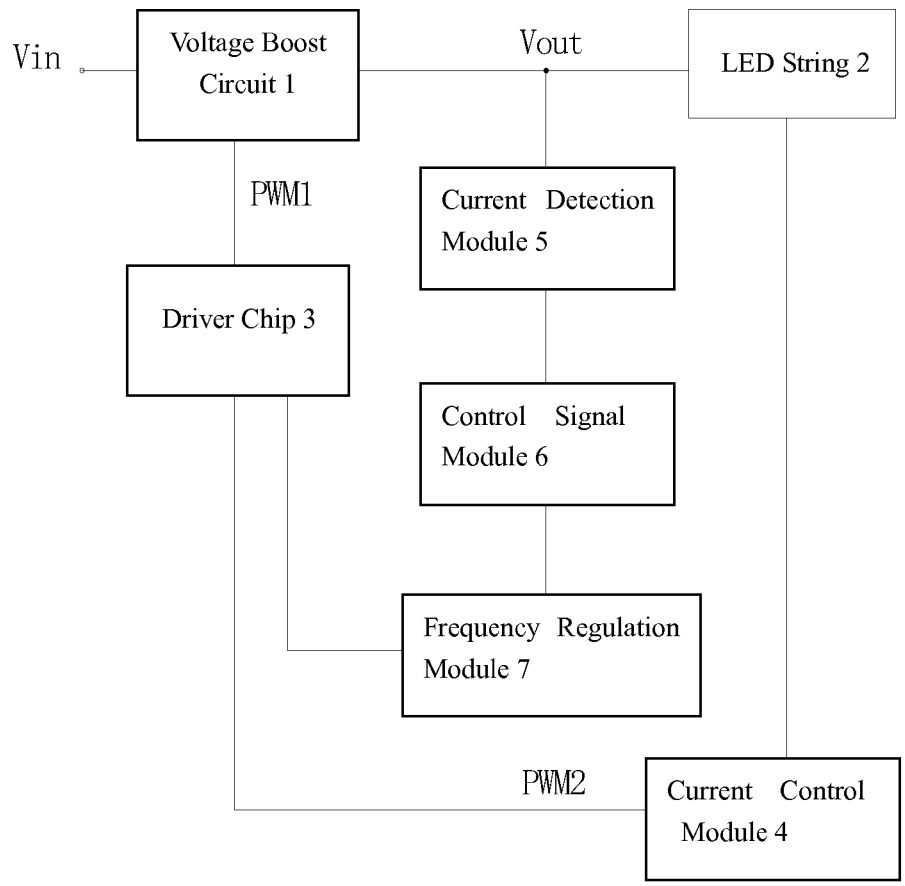
FIG. 3 is a schematic module connection diagram of a LED backlight driving circuit according to an exemplary embodiment of the present invention.

Referring to FIGS. 3 through 7, a driving circuit for the LED backlight source is provided. FIG. 3 is a schematic module connection diagram of the driving circuit. As illustrated in FIG. 3, the driving circuit includes: a voltage boost circuit 1, a driver chip 3, a current control module 4, a current detection module 5, a control signal module 6 and a frequency regulation module 7. The voltage boost circuit 1 is configured (i.e., structured and arranged) for converting an input voltage Vin into a desired output voltage Vout and then supplying the output voltage Vout to a LED string 2 as power supply voltage. The current control module 4 is electrically connected to a negative terminal of the LED string 2 and for adjusting a working current of the LED string 2. The driver chip 3 is configured for supplying the voltage boost circuit 1 with a first square wave signal PWM1 to facilitate the voltage boost circuit 1 to achieve a voltage boosting function, and further configured for supplying the current control module 4 with a second square wave signal PWM2 to facilitate the current control module 4 to achieve a current control function. The current detection module 5 is configured for detecting a working current of the LED string 2 and generates a detection signal according to a magnitude of the working current. The control signal module 6 receives the detection signal generated from the current detection module 5 and generates a control signal according to the detection signal. The frequency regulation module 7 receives the control signal generated from the control signal module 6 and generates a resistance according to the control signal. The frequency regulation module 7 further is electrically connected to the driver chip 3. The driver chip 3 regulates a driving frequency of the backlight driving circuit according to the resistance provided by the frequency regulation module 7.

Figure 7:
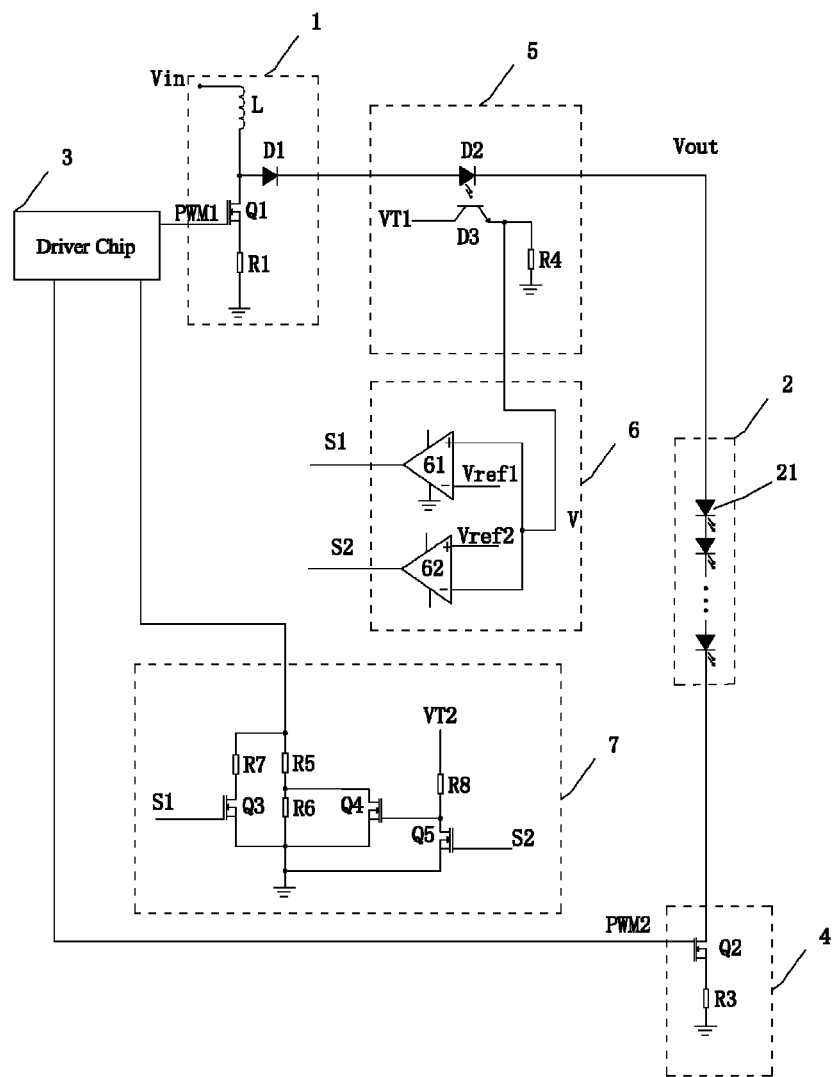
FIG. 7 is a circuit diagram of a LED backlight driving circuit according to an exemplary embodiment of the present invention.

Referring to FIG. 7, the voltage boost circuit 1 includes an inductor L, a rectifier diode D1, a first field effect transistor (FET) Q1 and a first resistor R1. A terminal of the inductor L receives the input DC voltage Vin, and another terminal of the inductor L is electrically connected to a positive terminal of the rectifier diode D1 as well as a drain of the first FET Q1. A gate of the first FET Q1 is driven by the first square wave signal PWM1 provided from the driver chip 3, and a source of the first FET Q1 is electrically connected to ground through the first resistor R1. A negative terminal of the rectifier diode D1 supplies the output voltage Vout to the LED string 2.

Still referring to FIG. 7, the current control module 4 includes a second FET Q2 and a third resistor R3. A drain of the second FET Q2 is electrically connected the negative terminal of the LED string 2, a source of the second FET Q2 is electrically connected to ground through the third resistor R3, and a gate of the second FET Q2 is electrically connected to the driver chip 3 and driven by the second square wave signal PWM2 supplied from the driver chip 3. By varying a duty ratio of the second square wave signal PWM2, the working current of the LED string 2 can be increased or decreased.

In the illustrated embodiment, FIG. 7 only illustrates one LED string 2, which includes multiple LEDs 21 electrically connected in series. As to the present invention, it may be multiple parallel-connected LED strings 2 electrically connected to the output terminal of the voltage boost circuit 1 instead, and negative terminals of the parallel-connected LED strings respectively are electrically connected to one current control module 4.

Figure 4:
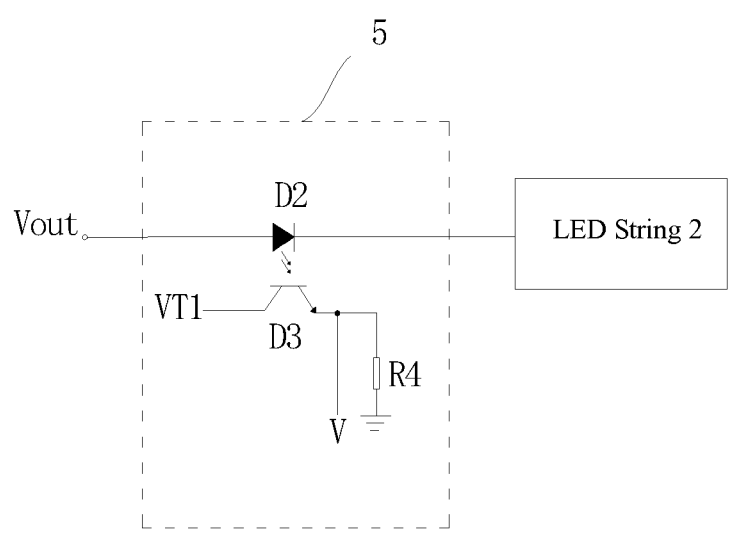
FIG. 4 is a circuit diagram of a current detection module according to an exemplary embodiment of the present invention.

In the illustrated embodiment, the current detection module 5 includes a photo coupler. Input terminals of the photo coupler are electrically connected in the loop of LED string 2, and an output terminal of the photo coupler generates a voltage detection signal. In particular, as illustrated in FIG. 4, the photo coupler includes a light emitting diode D2 and a photodiode D3. A positive terminal of the light emitting diode D2 is electrically connected to the output terminal Vout of the voltage boost circuit 1, and a negative terminal of the light emitting diode D2 is electrically connected to the positive terminal of the LED string 2. A positive terminal of the photodiode D3 is electrically connected to a first working voltage VT1, for example VT1=12V, and a negative terminal of the photodiode D3 is electrically connected to ground through a fourth resistor R4. A voltage detection signal V is generated at the negative terminal of the photodiode D3. Moreover, in the photo coupler, if a current at the input terminals is I1 (i.e., the working current of the LED string 2), and a current at the output terminal is I2, they satisfy the equation: $I1=\beta*I2$, where $\beta$ is a constant and determined by a conversion characteristic of the photo coupler. When the working current of the LED string 2 is changed, i.e., the current I1 at the input terminals is changed, the current I2 at the output terminal is changed correspondingly, and the voltage detection signal V generated at the negative terminal of the photodiode D3 is changed consequently.

Figure 5:
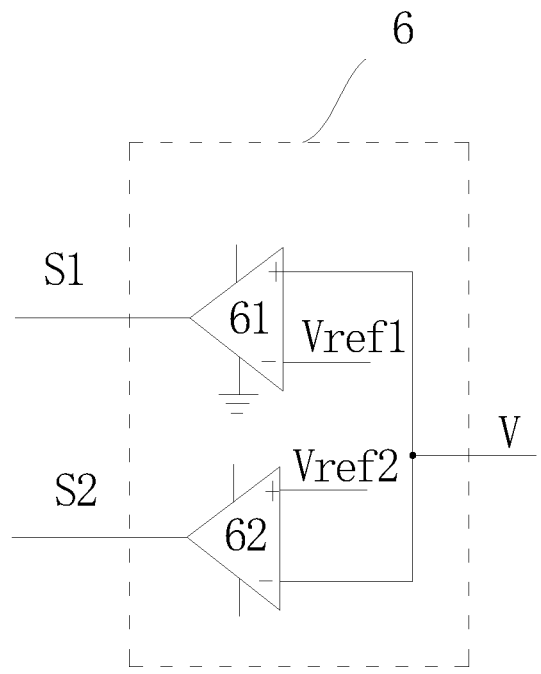
FIG. 5 is a circuit diagram of a control signal module according to an exemplary embodiment of the present invention.

In the illustrated embodiment, as illustrated in FIG. 5, the control signal module 6 includes a first comparator 61 and a second comparator 62. An inverting input terminal of the first comparator 61 receives a first reference voltage Vref1, a non-inverting input terminal of the second comparator 62 receives a second reference voltage Vref2, a non-inverting input terminal of the first comparator 61 and an inverting input terminal of the second comparator 62 both receive the voltage detection signal V outputted from the current detection module 5. Control signals S1, S2 respectively generated from output terminals of the first comparator 61 and the second comparator 62 are inputted to the frequency regulation module 7. The first reference voltage Vref1 is greater than the second reference voltage Vref2.

Figure 6:
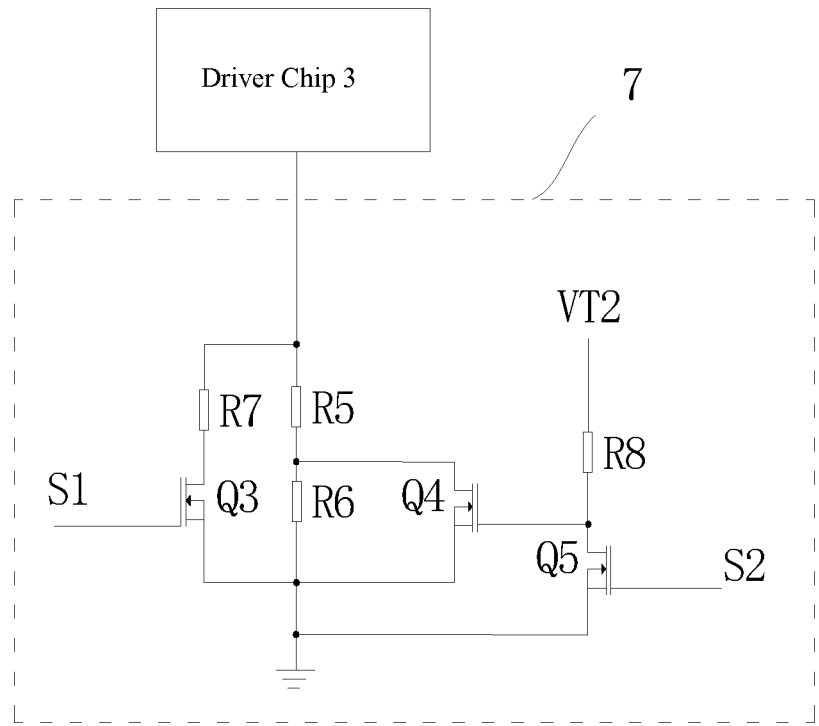
FIG. 6 is a circuit diagram of a frequency regulation module according to an exemplary embodiment of the present invention.

The frequency regulation module 7 may include multiple circuit loops constituted by multiple resistors and multiple switching elements electrically connected in a desired manner. Control signals S1, S2 generated from the control signal module 6 control the on-off states of the switching elements, so as to selectively switch on different circuit loops to communicate with the driver chip 3. Herein, different circuit loops have different resistances. The switching elements are FETs or triodes. For example, as illustrated in FIG. 6, the frequency regulation module 7 includes a fifth resistor R5, a sixth resistor R6, a seventh resistor R7, a eighth resistor R8, a third FET Q3, a fourth FET Q4 and a fifth FET Q5. A first terminal of the fifth resistor R5 is electrically connected to the driver chip 3, a second terminal of the fifth resistor R5 is electrically connected to ground through the sixth resistor R6. The first terminal of the fifth resistor R5 further is electrically connected to a terminal of the seventh resistor R7, and another terminal of the seventh resistor R7 is electrically connected to a drain of the third FET Q3. A source of the third FET Q3 is electrically connected to ground, and a gate of the third FET Q3 is electrically connected to the output terminal of the first comparator 61 to receive the control signal S1. The second terminal of the fifth resistor R5 further is electrically connected to a drain of the fourth FET Q4, a source of the fourth FET Q4 is electrically connected to ground, and a gate of the fourth FET Q4 is electrically connected to a second working voltage VT2 through the eighth resistor R8, for example VT2=5V. The gate of the fourth FET Q4 further is electrically connected to a drain of the fifth FET Q5, a source of the fifth FET Q5 is electrically connected to ground, and a gate of the fifth FET Q5 is electrically connected to the output terminal of the second comparator 62 to receive the control signal S2.

A working process of the LED backlight driving circuit as illustrated in FIG. 7 will be described below in detail.

(a) when the duty ratio of the second square wave signal PWM2 is at a maximum value, the working current of the LED string 2 is at a maximum value, the voltage detection signal V outputted from the current detection module 5 is at a maximum value, at this time, V>Vref1>Vref2. The control signals S1, S2 outputted from the control signal module 6 respectively are a logic high level and a logic low level. In the frequency regulation module 7, the third FET Q3 and the fourth FET Q4 are switched-on while the fifth FET Q5 is switched-off, and in the circuit loops of the frequency regulation module 7, the fifth resistor R5 and the seventh resistor R7 are in parallel electrically connected to the driver chip 3. At this time, the driving frequency is that:

$$Fs = \frac{\gamma}{R5 \times R7}(R5 + R7),$$

which corresponds to a maximum driving frequency.

(b) when the duty ratio of the second square wave signal PWM2 decreases, the working current of the LED string 2 correspondingly decreases, and when the voltage detection signal V outputted from the current detection module 5 decreases to that: Vref1>V>Vref2, the control signals S1, S2 outputted from the control signal module 6 both are logic low levels. In the frequency regulation module 7, the fourth FET Q4 is switched-on while the third FET Q3 and the fifth FET Q5 are switched-off. In the circuit loops of the frequency regulation module 7, only the fifth resistor R5 is electrically communicated with the driver chip 3. At this time, the driving frequency is that:

$$Fs = \frac{\gamma}{R5},$$

which corresponds to a smaller driving frequency.

(c) when the duty ratio of the second square wave signal PWM2 is at a minimum value, the working current of the LED string 2 is at a minimum value, and the voltage detection signal V outputted from the current detection module 5 is at a minimum value. At this time, Vref1>Vref2>V. The control signals S1, S2 outputted from the control signal module 6 respectively are a logic low level and a logic high level. In the frequency regulation module 7, the third FET Q3 and the fourth FET Q4 are switched-off while the fifth FET Q5 is switched-on. In the circuit loops of the frequency regulation module 7, the fifth resistor R5 and the sixth resistor R6 are in series electrically connected to the driver chip 3. At this time, the driving frequency is that:

$$Fs = \frac{\gamma}{R5 + R6},$$

which corresponds to a minimum driving frequency.

In summary, as to the backlight driving circuit of the present invention, by detecting the working current of LED string, according to the change of the detected working current, the frequency regulation module thereof selectively switches on circuit loops with different resistances to communicate with the driver chip, and thereby different driving frequencies can be obtained. That is, when the duty ratio of the square wave signal for controlling the working current of LED string decreases, the output power of the driving circuit decreases, the driving frequency is decreased correspondingly. As a result, the power consumption of the driving circuit is reduced and the driving efficiency is increased.

It is to be understood that in this specification, the relational terminologies such as "first" and "second" only are intended to discriminate an entity or operation from another entity or operation, and not necessarily to require or imply these entities or operations having actual relationships or orders existed therebetween. Moreover, the terminology of "including", "containing" and variations thereof herein is meant to cover non-exclusive inclusion, so that a process, method, article or apparatus including a series of items not only includes listed items but also includes other item(s) not being explicitly listed or inherent item(s) of the process, method, article or apparatus. In the absence of more restrictive conditions, the item limited by the phraseology "including one" does not exclude the existence of additional identical item(s) in the process, method, article or apparatus including the item.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A LED backlight driving circuit, comprising:
   a voltage boost circuit, configured for converting an input voltage into an output voltage for a LED string;
   a current control module, electrically connected to a negative terminal of the LED string and configured for regulating a working current of the LED string;

a driver chip, configured for supplying the voltage boost circuit with a first square wave signal to make the voltage boost circuit achieve a voltage boosting function and further supplying the current control module with a second square wave signal to make the current control module achieve a current control function;

a current detection module, configured for detecting the working current of the LED string and generating a detection signal according to the detected working current;

a control signal module, configured for receiving the detection signal generated from the current detection module and generating a control signal according to the detection signal;

a frequency regulation module, configured for receiving the control signal generated from the control signal module and generating a resistance according to the control signal and further being electrically connected to the driver chip and thereby the driver chip regulating a driving frequency of the LED backlight driving circuit according to the generated resistance.

2. The LED backlight driving circuit as claimed in claim 1, wherein the current detection module comprises a photo coupler, input terminals of the photo coupler are electrically connected in a loop of the LED string, and an output terminal of the photo coupler is configured for generating a voltage detection signal.

3. The LED backlight driving circuit as claimed in claim 2, wherein the photo coupler comprises a light emitting diode and a photodiode; a positive terminal of the light emitting diode is electrically connected to an output terminal of the voltage boost circuit, and a negative terminal of the light emitting diode is electrically connected to a positive terminal of the LED string; a positive terminal of the photodiode is electrically connected to a first working voltage, and a negative terminal of the photodiode is electrically connected to ground through a fourth resistor; the negative terminal of the photodiode further is configured for generating the voltage detection signal.

4. The LED backlight driving circuit as claimed in claim 1, wherein the control signal module comprises a first comparator and a second comparator; an inverting input terminal of the first comparator is electrically connected to a first reference voltage, a non-inverting input terminal of the second comparator is electrically connected to a second reference voltage, a non-inverting input terminal of the first comparator and an inverting input terminal of the second comparator are electrically connected to receive the detection signal outputted from the current detection module, control signals generated from output terminals of the first and second comparators are inputted to the frequency regulation module;

the detection signal is a voltage detection signal, and the first reference voltage is greater than the second reference voltage.

5. The LED backlight driving circuit as claimed in claim 1, wherein the frequency regulation module comprises a plurality of circuit loops formed by electrically connected a plurality of resistors and a plurality of switching elements; the control signal generated from the control signal module controls on-off states of the plurality of switching elements to thereby selectively switch on different circuit loops with different resistances to electrically communicate with the driver chip.

6. The LED backlight driving circuit as claimed in claim 5, wherein the plurality of switching elements are field effect transistors or triodes.

7. The LED backlight driving circuit as claimed in claim 5, wherein the frequency regulation module comprises a fifth resistor, a first terminal of the fifth resistor is electrically connected to the driver chip, and a second terminal of the fifth resistor is electrically connected to ground through a sixth resistor; the first terminal of the fifth resistor further is electrically connected to a terminal of a seventh resistor, another terminal of the seventh resistor is electrically connected to a drain of a third field effect transistor, a source of the third field effect transistor is electrically connected to ground, and a gate of the third field effect transistor is electrically connected to receive one the control signal outputted from the control signal module; the second terminal of the fifth resistor further is electrically connected to a drain of the fourth field effect transistor, a source of the fourth field effect transistor is electrically connected to ground, and a gate of the fourth field effect transistor is electrically connected to a second working voltage through a eighth resistor; a gate of the fourth field effect transistor further is electrically connected to a drain of a fifth field effect transistor, a source of the fifth field effect transistor is electrically connected to ground, and a gate of the fifth field effect transistor is electrically connected to another the control signal outputted from the control signal module;

the control signals outputted from the control signal module each are a logic high level or a logic low level, which make the third through fifth field effect transistors each are switched-on or switched-off and thereby the frequency regulation module generates different resistances to electrically communicate with the driver chip.

8. The LED backlight driving circuit as claimed in claim 1, wherein the current detection module comprises a photo coupler, the photo coupler comprises a light emitting diode and a photodiode, a positive terminal of the light emitting diode is electrically connected to an output terminal of the voltage boost circuit, a negative terminal of the light emitting diode is electrically connected to a positive terminal of the LED string, a positive terminal of the photodiode is electrically connected to a first working voltage, a negative terminal of the photodiode is electrically connected to ground through a fourth resistor, and the negative terminal of the photodiode further is configured for generating a voltage detection signal;

the control signal module comprises a first comparator and a second comparator, an inverting input terminal of the first comparator is electrically connected to receive a first reference voltage, a non-inverting input terminal of the second comparator is electrically connected to receive a second reference voltage, a non-inverting input terminal of the first comparator and an inverting input terminal of the second comparator are electrically connected to receive the voltage detection signal outputted from the current detection module, control signals generated from output terminals of the first comparator and the second comparator individually are inputted to the frequency regulation module, the first reference voltage is greater than the second reference voltage;

the frequency regulation module comprises a fifth resistor, a first terminal of the fifth resistor is electrically connected to the driver chip, and a second terminal of the fifth resistor is electrically connected to ground through a sixth resistor; the first terminal of the fifth resistor further is electrically connected to a terminal of a seventh resistor, another terminal of the seventh resistor is electrically connected to a drain of a third field effect transistor, a source of the third field effect transistor is electrically connected to ground, and a gate of the third field effect transistor is electrically connected to the output terminal of the first comparator; the second terminal of the fifth resistor further is electrically connected to a drain of a fourth field effect transistor, a source of the fourth field effect transistor is electrically connected to ground, and a gate of the fourth field effect transistor is electrically connected to a second working voltage through a eighth resistor; the gate of the fourth field effect transistor further is electrically connected to a drain of a fifth field effect transistor, a source of the fifth field effect transistor is electrically connected to ground, and a gate of the fifth field effect transistor is electrically connected to the output terminal of the second comparator.

9. The LED backlight driving circuit as claimed in claim 8, wherein the current control module comprises a second field effect transistor and a third resistor; a drain of the second field effect transistor is electrically connected to the negative terminal of the LED string, a source of the second field effect transistor is electrically connected to ground through the third resistor, a gate of the second field effect transistor is electrically connected to the driver chip and driven by the second square wave signal supplied by the driver chip, and thereby by varying a duty ratio of the second square wave signal, the working current of the LED string is increased or decreased.

10. The LED backlight driving circuit as claimed in claim 1, wherein the current control module comprises a second field effect transistor and a third resistor; a drain of the second field effect transistor is electrically connected to the negative terminal of the LED string, a source of the second field effect transistor is electrically connected to ground through the third resistor, a gate of the second field effect transistor is electrically connected to the driver chip and driven by the second square wave signal supplied by the driver chip, and thereby by varying a duty ratio of the second square wave signal, the working current of the LED string is increased or decreased.

11. A liquid crystal display device comprising a liquid crystal panel and a backlight module disposed opposite to each other, the backlight module being for providing a display light source for the liquid crystal panel to thereby make the liquid crystal panel display an image, the backlight module using a LED backlight source; a driving circuit for the LED backlight source comprising:
a voltage boost circuit, configured for converting an input voltage into an output voltage for a LED string;
a current control module, electrically connected to a negative terminal of the LED string and configured for regulating a working current of the LED string;
a driver chip, configured for supplying the voltage boost circuit with a first square wave signal to make the voltage boost circuit achieve a voltage boosting function and further supplying the current control module with a second square wave signal to make the current control module achieve a current control function;
a current detection module, configured for detecting the working current of the LED string and generating a detection signal according to the detected working current;
a control signal module, configured for receiving the detection signal generated from the current detection module and generating a control signal according to the detection signal;
a frequency regulation module, configured for receiving the control signal generated from the control signal module and generating a resistance according to the control signal and further being electrically connected to the driver chip and thereby the driver chip regulating a driving frequency of the driving circuit according to the generated resistance.

12. The liquid crystal display device as claimed in claim 11, wherein the current detection module comprises a photo coupler, input terminals of the photo coupler are electrically connected in a loop of the LED string, and an output terminal of the photo coupler is configured for generating a voltage detection signal.

13. The liquid crystal display device as claimed in claim 12, wherein the photo coupler comprises a light emitting diode and a photodiode; a positive terminal of the light emitting diode is electrically connected to an output terminal of the voltage boost circuit, and a negative terminal of the light emitting diode is electrically connected to a positive terminal of the LED string; a positive terminal of the photodiode is electrically connected to a first working voltage, and a negative terminal of the photodiode is electrically connected to ground through a fourth resistor; the negative terminal of the photodiode further is configured for generating the voltage detection signal.

14. The liquid crystal display device as claimed in claim 11, wherein the control signal module comprises a first comparator and a second comparator; an inverting input terminal of the first comparator is electrically connected to a first reference voltage, a non-inverting input terminal of the second comparator is electrically connected to a second reference voltage, a non-inverting input terminal of the first comparator and an inverting input terminal of the second comparator are electrically connected to receive the detection signal outputted from the current detection module, control signals generated from output terminals of the first and second comparators are inputted to the frequency regulation module;
the detection signal is a voltage detection signal, and the first reference voltage is greater than the second reference voltage.

15. The liquid crystal display device as claimed in claim 11, wherein the frequency regulation module comprises a plurality of circuit loops formed by electrically connected a plurality of resistors and a plurality of switching elements; the control signal generated from the control signal module controls on-off states of the plurality of switching elements to thereby selectively switch on different circuit loops with different resistances to electrically communicate with the driver chip.

16. The liquid crystal display device as claimed in claim 15, wherein the plurality of switching elements are field effect transistors or triodes.

17. The liquid crystal display device as claimed in claim 15, wherein the frequency regulation module comprises a fifth resistor, a first terminal of the fifth resistor is electrically connected to the driver chip, and a second terminal of the fifth resistor is electrically connected to ground through a sixth resistor; the first terminal of the fifth resistor further is electrically connected to a terminal of a seventh resistor, another terminal of the seventh resistor is electrically connected to a drain of a third field effect transistor, a source of the third field effect transistor is electrically connected to ground, and a gate of the third field effect transistor is electrically connected to receive one the control signal outputted from the control signal module; the second terminal of the fifth resistor further is electrically connected to a drain of the fourth field effect transistor, a source of the fourth field effect transistor is electrically connected to ground, and a gate of the fourth field effect transistor is electrically connected to a second working voltage through a eighth resistor; a gate of the fourth field effect transistor further is electrically connected to a drain of a fifth field effect transistor, a source of the fifth field effect transistor is electrically connected to ground, and a gate of the fifth field effect transistor is electrically connected to another the control signal outputted from the control signal module;

the control signals outputted from the control signal module each are a logic high level or a logic low level, which make the third through fifth field effect transistors each are switched-on or switched-off and thereby the frequency regulation module generates different resistances to electrically communicate with the driver chip.

18. The liquid crystal display device as claimed in claim 11, wherein the current detection module comprises a photo coupler, the photo coupler comprises a light emitting diode and a photodiode, a positive terminal of the light emitting diode is electrically connected to an output terminal of the voltage boost circuit, a negative terminal of the light emitting diode is electrically connected to a positive terminal of the LED string, a positive terminal of the photodiode is electrically connected to a first working voltage, a negative terminal of the photodiode is electrically connected to ground through a fourth resistor, and the negative terminal of the photodiode further is configured for generating a voltage detection signal;

the control signal module comprises a first comparator and a second comparator, an inverting input terminal of the first comparator is electrically connected to receive a first reference voltage, a non-inverting input terminal of the second comparator is electrically connected to receive a second reference voltage, a non-inverting input terminal of the first comparator and an inverting input terminal of the second comparator are electrically connected to receive the voltage detection signal outputted from the current detection module, control signals generated from output terminals of the first comparator and the second comparator individually are inputted to the frequency regulation module, the first reference voltage is greater than the second reference voltage;

the frequency regulation module comprises a fifth resistor, a first terminal of the fifth resistor is electrically connected to the driver chip, and a second terminal of the fifth resistor is electrically connected to ground through a sixth resistor; the first terminal of the fifth resistor further is electrically connected to a terminal of a seventh resistor, another terminal of the seventh resistor is electrically connected to a drain of a third field effect transistor, a source of the third field effect transistor is electrically connected to ground, and a gate of the third field effect transistor is electrically connected to the output terminal of the first comparator; the second terminal of the fifth resistor further is electrically connected to a drain of a fourth field effect transistor, a source of the fourth field effect transistor is electrically connected to ground, and a gate of the fourth field effect transistor is electrically connected to a second working voltage through a eighth resistor; the gate of the fourth field effect transistor further is electrically connected to a drain of a fifth field effect transistor, a source of the fifth field effect transistor is electrically connected to ground, and a gate of the fifth field effect transistor is electrically connected to the output terminal of the second comparator.

19. The liquid crystal display device as claimed in claim 18, wherein the current control module comprises a second field effect transistor and a third resistor; a drain of the second field effect transistor is electrically connected to the negative terminal of the LED string, a source of the second field effect transistor is electrically connected to ground through the third resistor, a gate of the second field effect transistor is electrically connected to the driver chip and driven by the second square wave signal supplied by the driver chip, and thereby by varying a duty ratio of the second square wave signal, the working current of the LED string is increased or decreased.

20. The liquid crystal display device as claimed in claim 11, wherein the current control module comprises a second field effect transistor and a third resistor; a drain of the second field effect transistor is electrically connected to the negative terminal of the LED string, a source of the second field effect transistor is electrically connected to ground through the third resistor, a gate of the second field effect transistor is electrically connected to the driver chip and driven by the second square wave signal supplied by the driver chip, and thereby by varying a duty ratio of the second square wave signal, the working current of the LED string is increased or decreased.

* * * * *